United States Patent
Chakrabarti et al.

(10) Patent No.: US 8,002,056 B2
(45) Date of Patent: Aug. 23, 2011

(54) DOUBLE-ENDED INVERTER SYSTEM WITH ISOLATED NEUTRAL TOPOLOGY

(75) Inventors: Sibaprasad Chakrabarti, Torrance, CA (US); Gregory S. Smith, Woodland Hills, CA (US); James M. Nagashima, Cerritos, CA (US); Brian A. Welchko, Torrance, CA (US); Milun Perisic, Torrance, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 659 days.

(21) Appl. No.: 12/106,875

(22) Filed: Apr. 21, 2008

(65) Prior Publication Data
US 2009/0032316 A1  Feb. 5, 2009

Related U.S. Application Data

(60) Provisional application No. 60/952,772, filed on Jul. 30, 2007.

(51) Int. Cl.
*H02K 1/32* (2006.01)
*H02K 3/24* (2006.01)
*H02K 5/18* (2006.01)

(52) U.S. Cl. ............. 180/65.22; 318/139; 318/801; 310/112; 310/113; 310/126; 180/65.1; 180/65.21

(58) Field of Classification Search .......... 318/139, 318/801; 310/112, 113, 126; 180/65.22, 180/65.1, 65.21
See application file for complete search history.

(56) References Cited

U.S. PATENT DOCUMENTS

| 5,099,186 | A | * | 3/1992 | Rippel et al. | .............. 318/803 |
| 5,389,749 | A |   | 2/1995 | Hokari et al. | |
| 7,130,205 | B2 |  | 10/2006 | Peng | |
| 7,154,237 | B2 |  | 12/2006 | Welchko et al. | |
| 7,199,535 | B2 | * | 4/2007 | Welchko et al. | .............. 318/105 |

FOREIGN PATENT DOCUMENTS

| CN | 86108522 A | 11/1987 |
| EP | 1808958 A2 | 7/2007 |
| GB | 2267004 A | 11/1993 |

OTHER PUBLICATIONS

Chinese Office Action dated Sep. 10, 2010, for Application No. 200810214792.7.

(Continued)

*Primary Examiner* — Bentsu Ro
*Assistant Examiner* — Erick Glass
(74) *Attorney, Agent, or Firm* — Ingrassia Fisher & Lorenz, P.C.

(57) ABSTRACT

Systems and methods are provided for an inverter system for use in a vehicle having a first energy source and a second energy source. The system comprises a motor having a first set of windings and a second set of windings. The first set of windings is electrically isolated from the second set of windings. The system further comprises a first inverter coupled to the first energy source and adapted to drive the motor, wherein the first set of windings are coupled to the first inverter. The system also comprises a second inverter coupled to the second energy source and adapted to drive the motor, wherein the second set of windings are coupled to the second inverter. A controller is coupled to the first inverter and the second inverter.

18 Claims, 4 Drawing Sheets

OTHER PUBLICATIONS

Singh, G.K., "Multi-Phase Induction Machine Drive Research—A Survey," Elsevier Science B.V., Electric Power Systems Research, 2002, pp. 139-147.

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

* cited by examiner

DOUBLE-ENDED INVERTER SYSTEM WITH ISOLATED NEUTRAL TOPOLOGY

CROSS-REFERENCE TO RELATED APPLICATION(S)

This application claims the benefit of U.S. provisional patent application Ser. No. 60/952,772, filed Jul. 30, 2007.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Accordingly, systems and methods have been developed for operating a motor coupled to multiple power sources without a DC/DC converter while maximizing the performance of the motor by utilizing dual inverter electrical systems.

Prior art systems are limited to designs for three-phase motors traditionally used in automobiles. The design of many of these systems requires that two energy sources have substantially the same voltage level. Additionally, in a situation where one of the sources fails for some reason (i.e., extreme cold temperatures), prior art designs may not accommodate operating a motor using the other source alone.

Accordingly, it is desirable to provide a dual inverter system to accommodate the use of energy sources with different operating characteristics to allow for cold cranking of a vehicle in the event of a failure of one of the energy sources. Other desirable features and characteristics of the present invention will become apparent from the subsequent detailed description and the appended claims, taken in conjunction with the accompanying drawings and the foregoing technical field and background

BRIEF SUMMARY

An apparatus is provided for an automotive drive system. The automotive drive system comprises a four-phase motor having a first set of windings and a second set of windings, the first set of windings and the second set of windings being electrically isolated. A first inverter is coupled to the first set of windings. A second inverter is coupled to the second set of windings.

An apparatus is provided for an inverter system for use in a vehicle having a first energy source and a second energy source. The inverter system comprises a motor having a first set of windings and a second set of windings. The first set of windings is electrically isolated from the second set of windings. The inverter system further comprises a first inverter coupled to the first energy source and adapted to drive the motor, wherein the first set of windings are coupled to the first inverter. The inverter system also comprises a second inverter coupled to the second energy source and adapted to drive the motor, wherein the second set of windings are coupled to the second inverter. A controller is coupled to the first inverter and the second inverter. The controller is configured to control the first inverter and the second inverter to achieve desired power flow between the first energy source, the second energy source, and the motor.

A method is provided for controlling a four-phase motor using a double-ended inverter system coupled to a first energy source and a second energy source. The method comprises determining an operating condition and modulating the double-ended inverter system to provide power to the four-phase motor using both energy sources in response to a first operating condition. The method further comprises modulating the double-ended inverter system to provide electromagnetic charging of either energy source in response to a second operating condition and modulating the double-ended inverter system to produce an effective neutral point of the motor and provide power to the four-phase motor by either energy source in response to a third operating condition.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. The terms "first", "second" and other such numerical terms referring to structures do not imply a sequence or order unless clearly indicated by the context.

Figure 1:
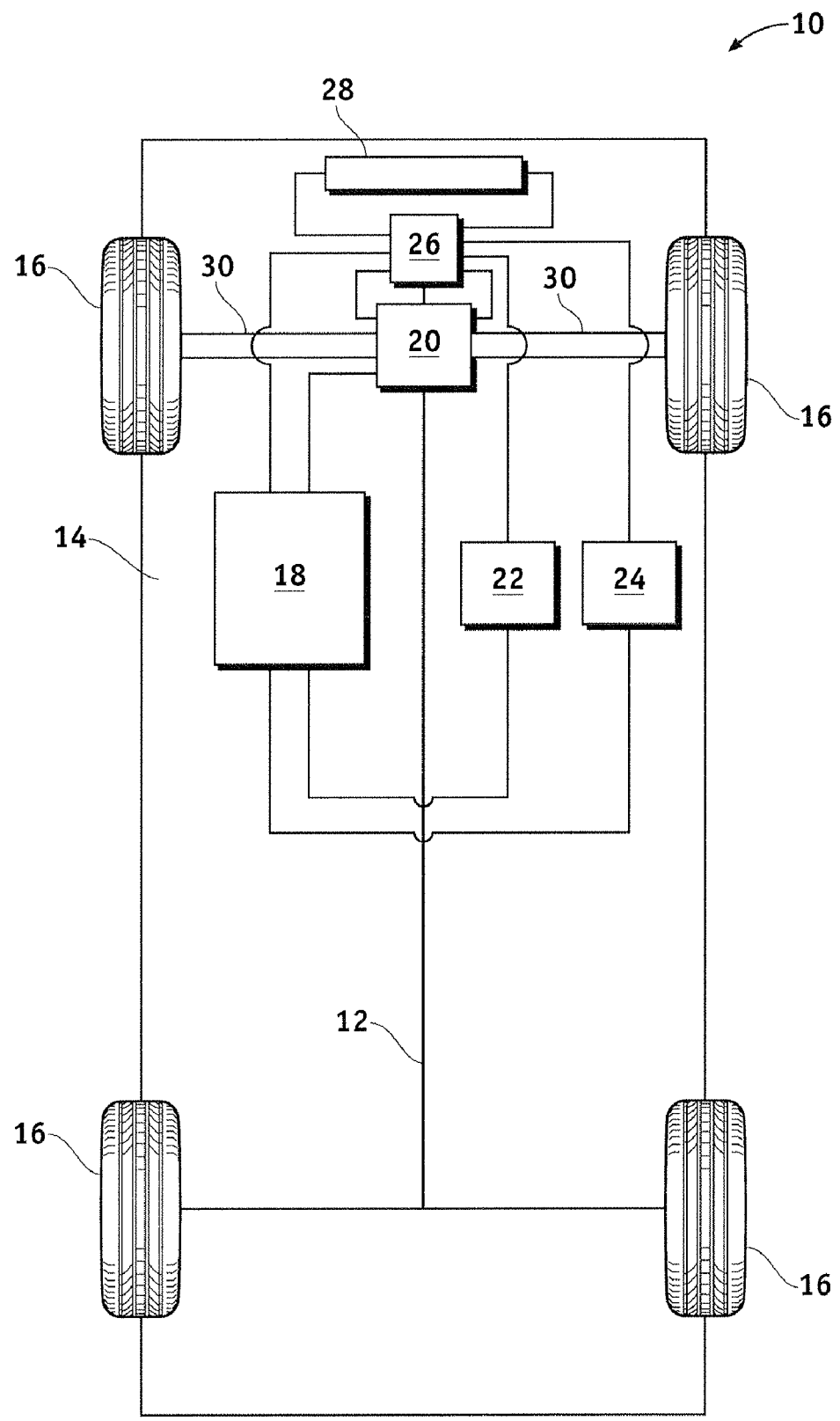
FIG. 1 is a schematic view of an exemplary automobile in accordance with one embodiment.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a motor 20 (i.e., an electric motor/generator, traction motor, etc.), a first energy source 22, a second energy source 24, a power inverter assembly 26, and a radiator 28. The radiator 28 is connected to the frame at an outer portion thereof and although not illustrated in detail, includes multiple cooling channels that contain a cooling fluid (i.e., coolant), such as water and/or ethylene glycol (i.e., "antifreeze), and is coupled to the power inverter assembly 26 and the motor 20. In one embodiment, the power inverter assembly 26 receives and shares coolant with the electric motor 20. As shown in FIG. 1, the motor 20 may also include a transmission integrated therein such that the motor 20 and the transmission are mechanically coupled to at least some of the wheels 16 through one or more drive shafts 30.

As shown, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, an ultracapacitor, or another suitable voltage source. A battery may be any type of battery suitable for use in a desired application, such as a lead acid battery, a lithium-ion battery, a nickel-metal battery, or another rechargeable battery. An ultracapacitor may comprise a supercapacitor, an electrochemical double layer capacitor, or any other electrochemical capacitor with high energy density suitable for a desired application.

Figure 2:
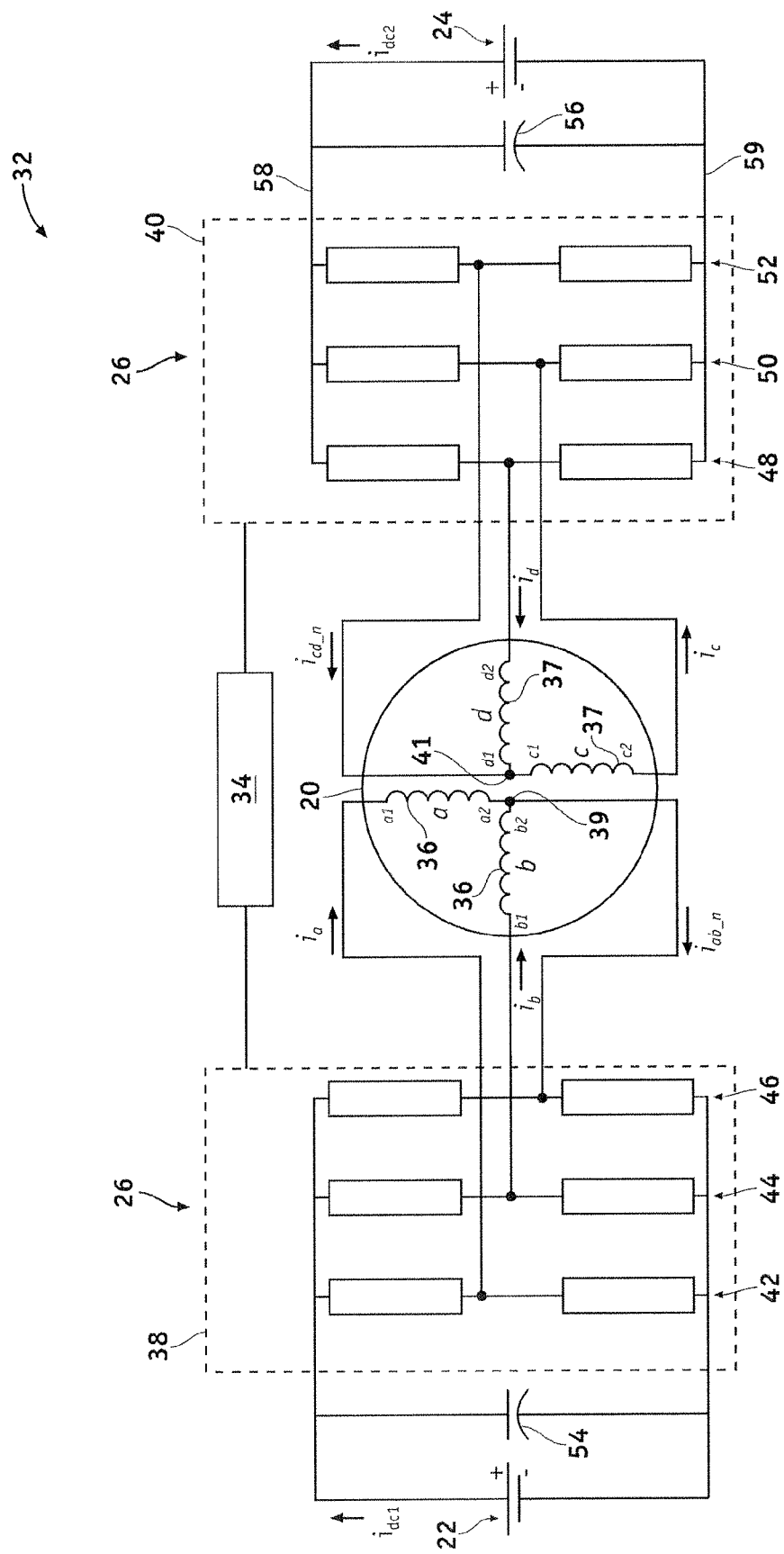
FIG. 2 is a schematic view of a double-ended inverter system in accordance with one embodiment.

Referring now to FIGS. 1 and 2, a double-ended inverter system 32 may be adapted to drive a motor 20 having more than three phases in accordance with one embodiment. The double-ended inverter system 32 includes the motor 20, the first energy source 22, the second energy source 24, the power inverter assembly 26, and a controller 34.

The motor 20 is a multi-phase alternating current (AC) motor and includes a first set of windings 36 (or coils) and a second set of windings 37, wherein each winding corresponds to one phase of the motor 20. Although not illustrated, the motor 20 includes a stator assembly (including the coils), a rotor assembly (including a ferromagnetic core), and a cooling fluid (i.e., coolant), as will be appreciated by one skilled in the art. The motor 20 may be an induction motor, a permanent magnet motor, or any type suitable for the desired application.

In an exemplary embodiment, the motor 20 is a four-phase motor, with the first set of windings 36 and the second set of windings 37 each corresponding to electrically isolated two-phase wiring structures. It should be noted the sets of windings 36 and 37 are electrically isolated, meaning that current in each set of windings 36 and 37 may be controlled independently and differ from the current in the other set of windings 36 and 37. The sets of windings 36 and 37 may still transfer energy to the other set of windings 36 and 37 electromagnetically using magnetomotive force generated by the motor 20. The controller 34 may independently control the manner in which power flows from each energy source 22, 24 to achieve a desired power flow.

The use of a motor 20 comprising two electrically isolated sets of windings 36 and 37 driven by two energy sources 22, 24 is desirable, particularly in an automobile 10 operating in a hybrid/electric mode, because it provides improved reliability. For example, if a first energy source 22, such as a battery in an automobile 10 fails for some reason (i.e. cold or inclement weather), the motor 20 may still by started and driven by the second energy source 24 independently, as discussed in further detail below.

Figure 3:
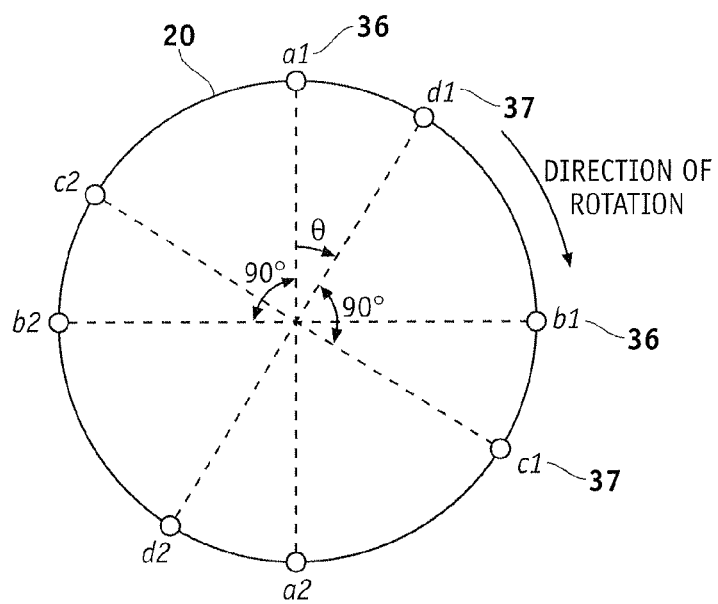
FIG. 3 is a schematic view of the stator winding structure for a motor for use in the double-ended inverter system of FIG. 2 in accordance with one embodiment.

Referring now to FIGS. 2 and 3, in an exemplary embodiment, the first set of windings 36 comprises a first phase (a) and a second phase (b). In an exemplary embodiment, the spatial displacement between the first phase (a) and the second phase (b) is such that the electrical angle between the first phase and the second phase is 90° as shown. In an exemplary embodiment, the two phases are connected to create a first neutral point 39 within the motor 20. In an exemplary embodiment, the spatial displacement between the first phase (a) and the second phase (b) is adjusted to maintain an electrical angle of 90° in the stator frame. It will be appreciated in the art that maintaining a 90° electrical angle results in smooth torque production in the motor 20 in response to a balanced two-phase current excitation.

Figure 4:
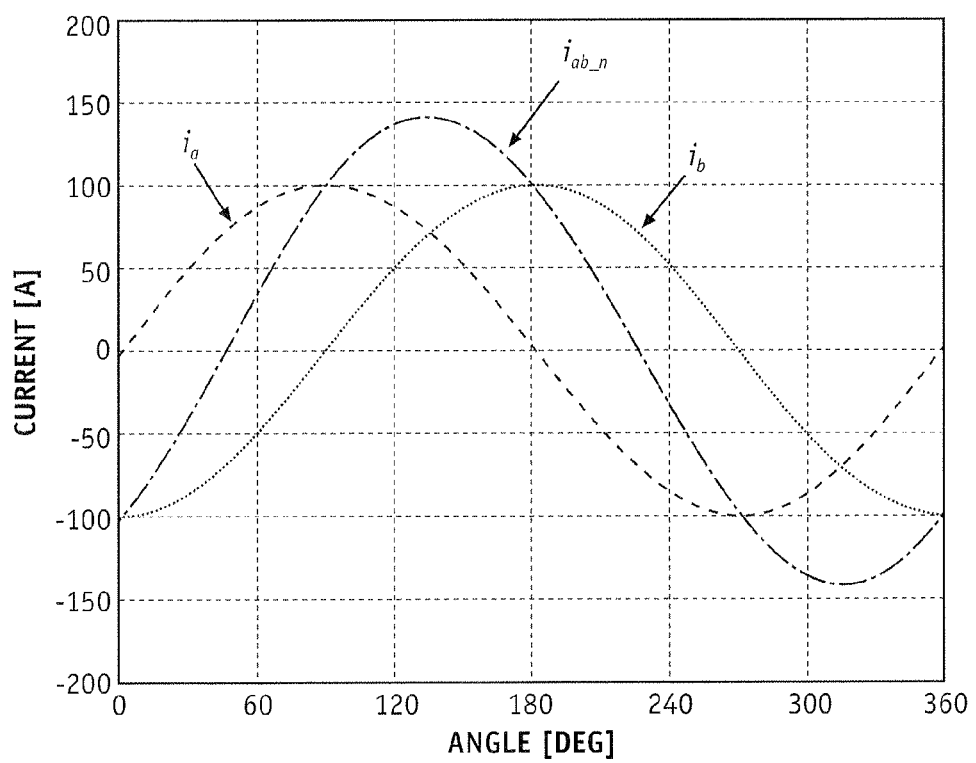
FIG. 4 is a graph of motor phase currents in accordance with one embodiment.

Referring now to FIG. 4, providing currents to the first phase ($i_a$) and the second phase ($i_b$) which are 90° out of phase in the time domain results in a smooth rotating magnetic field. This is shown by the current flowing to the first neutral point 39 ($i_{ab\_n}$) which is a sum of the two phase currents ($i_a$ and $i_b$).

Referring to FIGS. 2 and 3, the second set of windings 37 comprises a third phase (c) and a fourth phase (d). For the same reasons as set forth above, in an exemplary embodiment, the spatial displacement between the third phase (c) and the fourth phase (d) is such that the electrical angle between the third phase and the fourth phase is 90°. Additionally, the spatial displacement between the two sets of windings 36 and 37 may vary depending upon the design, as shown in FIG. 3 by the symbol θ. In an exemplary embodiment, the spatial displacement θ is also 90°, as shown in FIG. 2. While FIG. 3 depicts the windings 36 and 37 having a concentrated winding structure, the concept and principles discussed herein can be extended for a distributed winding structure.

Additionally, it will be appreciated by those of skill in the art that a multi-phase motor 20 can provide additional advantages over a conventional lower phase (i.e., three-phase) machine depending on the spatial displacement of the two sets of windings 36 and 37 within the stator. For example, varying the spatial displacement between two sets of windings 36 and 37 may reduce or eliminate air gap flux harmonics and corresponding torque harmonics and rotor copper losses produced by those air flux harmonics. The spatial displacement of the windings 36 and 37 and phase-connections may be varied to suit a desired application. In an exemplary embodiment, the fundamental frequencies of the two inverters 38 and 40 are the same, resulting in a more sinusoidal field distribution and current.

Referring again to FIG. 2, the power inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the inverters 38 and 40 are arranged into three pairs (or legs), with pairs 42, 44, and 46 being in the first inverter 38 and pairs 48, 50, and 52 being in the second inverter 40.

In an exemplary embodiment, the first phase (a) of the first set of windings 36 of the motor 20 is electrically connected, at opposing ends thereof, between the switches of switch pair 42 in the first inverter 38 and the second phase (b) at the first neutral point 39. The second phase (b) of the first set of windings 36 is connected between the switches of pair 44 in the first inverter 38 and the first neutral point 39 as shown. The first neutral point 39 is connected between the switches of pairs 46. Similarly, the two phases (c, d) of the second set of windings 37 may be connected between the switches of pairs 48, 50, and 52 and a second neutral point 41 as shown. Additionally, in an alternative embodiment, the negative rail of the two energy sources 22, 24 may also be connected in order to creating a common negative point (not shown).

In this configuration, because the energy sources 22, 24 are electrically isolated, energy sources 22, 24 with different voltage levels, power ratings, operating characteristics, etc. may be used simultaneously. This is particularly advantageous compared to other inverter systems where, as a practical matter, the energy sources 22, 24 are required to be nearly identical. For example, in this case, a high voltage source ($\geqq$100V) such as a fuel cell may be used with a 12 V battery to simultaneously drive the motor 20.

Still referring to FIG. 2, the double-ended inverter system 32 may also include first and second capacitors 54 and 56 respectively connected in parallel with the first and second energy sources 22, 24 to smooth current ripple during operation. The controller 34 is in operable communication and/or electrically connected to the first and second inverters 38 and 40. The controller 34 is responsive to commands received from the driver of the automobile 10 (i.e. via an accelerator pedal) and provides commands to the first inverter 38 and the second inverter 40, as will be described, to control the output of the inverters 38 and 40.

Referring again to FIG. 1, the electronic control system 18 is in operable communication with the motor 20, the first energy source 22, the second energy source 24, and the power inverter assembly 26. Although not shown in detail, the electronic control system 18 may include various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

During operation, the automobile 10 is operated by providing power to the wheels 16 with the electric motor 20 which receives power from the first energy source 22 and the second energy source 24 in an alternating manner and/or with the first energy source 22 and the second energy source 24 simultaneously. In order to power the motor 20, DC power is provided from the first energy source 22 and the second energy source 24 to the first and second inverters 38 and 40 respectively, which convert the DC power into AC power, as is commonly understood in the art. The first and second inverters 38 and 40 produce AC voltages across the windings 36 and 37 (or phases). As is commonly understood, the required voltages across the windings 36 and 37 of the motor 20 are dependent on the speed, commanded torque (i.e., commanded synchronous frame currents), and other motor parameters.

Figure 5:
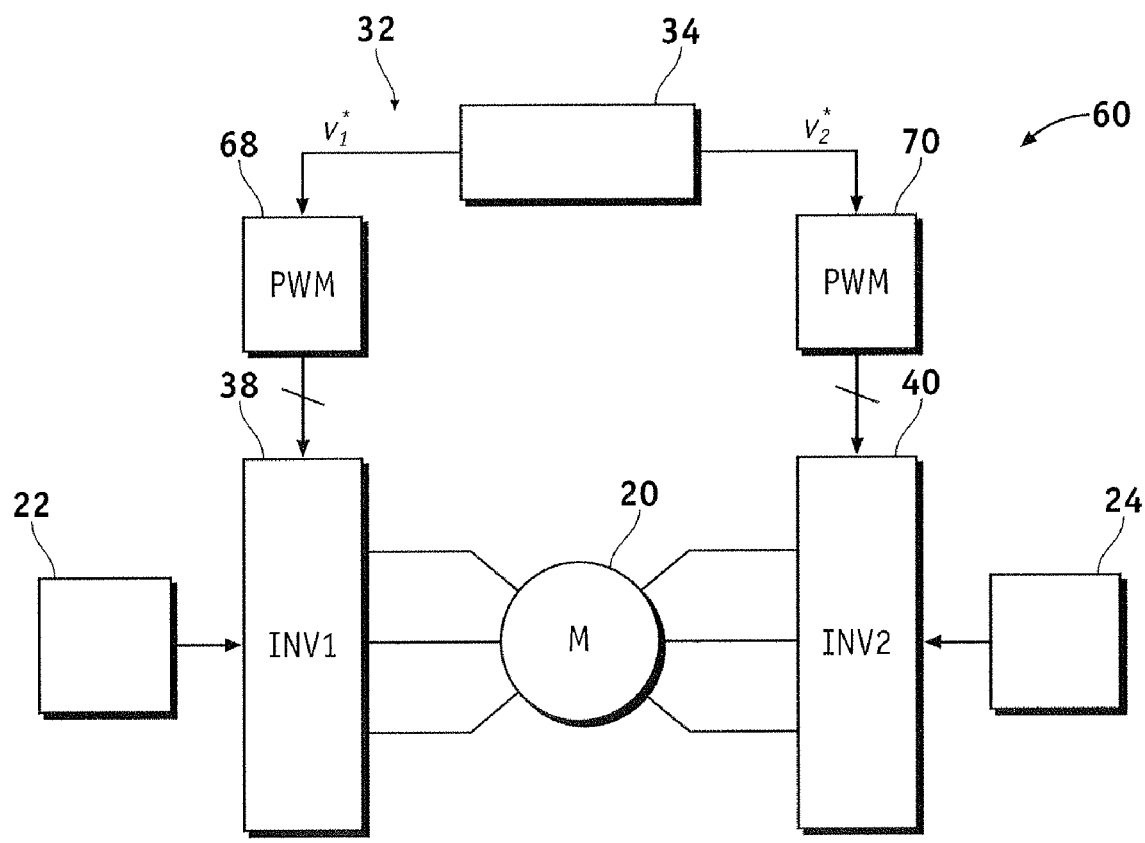
FIG. 5 is a schematic view of a control system for operating the double-ended inverter system of FIG. 2 in accordance with one embodiment.

FIG. 5 illustrates a control system 60 for operating a motor 20 in a double-ended inverter system 32 utilizing the principles described above in accordance with one embodiment. High frequency pulse width modulation (PWM) may be employed by the controller 34 to modulate and control the inverters 38 and 40 and manage the voltage produced by the inverters 38 and 40. The control system 60 includes first and second PWM blocks 68 and 70, and the double-ended inverter system 32.

The controller 34 provides a control algorithm that achieves desired power flow between the first and second energy sources 22, 24 while producing the commanded torque inside the motor 20. Although not shown, the control system 60 receives a torque command for the motor 20 from which the controller 34 may determine power commands for the first energy source 22 (and/or the first inverter 38) and the second energy source 24 (and/or the second inverter 40), as well as synchronous frame currents for the windings 36 and 37 within the motor 20.

If the motor 20 does not require the maximum power output of one energy source 22 or 24, the extra power from the energy source 22 or 24 may be used to charge the other energy source 22 or 24. For illustrative purposes and the sake of brevity, it may be discussed as though the first energy source 22 produces excess power to charge the second energy source 24, however, it will be appreciated by those skilled in the art that numerous alternative desired power flows are possible and this distinction is not limiting but made merely for reference purposes.

Referring now to FIG. 5 the controller 34 may provide the first and second PWM blocks 68 and 70 with modulating voltage signals $v_1^*$ and $v_2^*$. The PWM blocks 68 and 70 may generate PWM signals to operate the switches within the first and second inverters 38 and 40 to cause the desired output voltages to be applied across the windings 36 and 37 to operate the motor 20 with the required torque. The controller 34 may be configured to determine the operating mode in accordance with one embodiment. In one operating mode, the first energy source 22 may independently provide the power required by the motor 20. In another operating mode, the maximum power output of the first energy source 22 may be less than the power required by the motor 20. If the motor 20 requires power from the first energy source 22, as well as power from the second energy source 24, the controller 34 may be configured to control power flow from the second energy source 24 to the motor 20 in combination with the first energy source 22 by modulating the double-ended inverter system 32.

In another operating mode, the first energy source 22 may have the capability to deliver an excess amount of power (i.e., reserve power), in addition to the power required by the motor 20 to produce a commanded torque. This excess power may be supplied to and stored by the second voltage source 24 and may be considered a negative DC current in the voltage bus of the second voltage source 24 because of the indicated directions of current flow shown in FIG. 2. The reserve power may be understood to be the difference between the power required by the motor 20 and the maximum power output of the first energy source 22. The controller 34 may modulate the double-ended inverter system 32 to enable electromagnetic charging of the second energy source 24 using the magnetomotive force of motor 20. In another embodiment, the controller 34 may be configured to enable electromagnetic charging of both energy sources 22, 24 in another operating mode.

In a third operating mode, the first energy source 22 may fail for some reason (i.e., cold temperatures or inclement weather). In an exemplary embodiment, the second energy source 24 may be designed to operate in inclement weather or cold temperatures. For example, a lithium-ion battery which performs at cold temperatures may be chosen as the second energy source 24, while the first energy source 22 may be a conventional lead acid battery. The controller 34 may detect an inability of the first energy source 22 to provide power, and control power flow from the second energy source 24 to the motor 20 by modulating the double-ended inverter system 32 to produce an effective neutral point of the motor 20.

Many combinations of voltage across the windings 36 and 37 may produce the required torque in the motor 20 and achieve desired power flow to (or from) the energy sources 22, 24 and the motor 20. An optimal operating point determines the modulating voltage across the terminals of the inverters 38 and 40. It will be appreciated by those skilled in the art that conditions for determining an optimal operating point are left to the designer and will vary depending upon the application for which the motor 20 is being used, along with the types of energy sources 22, 24 selected. It will be appreciated by those skilled in the art that the control system 60 can be further modified to incorporate appropriate feedback signals and other methods known in the art to control the inverters 38 and 40, which are beyond the scope of this disclosure.

One advantage of the system and/or method described above is that the electrical system used to power the motor 20 with two separate energy sources 22, 24 is greatly simplified, as a conventional DC/DC power converter is not required. Using the configuration described above allows for the possibility of using two energy sources 22, 24 with different voltage levels and operating characteristics. Additionally, in a situation where one of the sources 22, 24 is unavailable for some reason (i.e., extreme cold temperatures), the double-ended inverter system 32 accommodates operating a motor 20 or cold cranking an automobile 10 using one energy source 22, 24 alone. However, as the described above, the performance of the motor 20 is not impaired as the commanded torque may still be generated within the motor 20, while allowing excess power to flow between the energy sources 22, 24.

Other embodiments may utilize system and method described above in different types of automobiles, different vehicles (e.g., watercraft and aircraft), or in different electrical systems altogether, as it may be implemented in any situation where the voltages of the two sources dynamically change over a wide range. The motor 20 and the inverters 38 and 40 may have different numbers of phases, and the systems described herein should not be construed as limited to a four-phase design. Other forms of energy sources 22, 24 may be used, such as current sources and loads including diode rectifiers, thyristor converters, fuel cells, inductors, capacitors, and/or any combination thereof.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive drive system comprising:
  a four-phase motor having a first set of windings and a second set of windings, the first set of windings and the second set of windings being electrically isolated, wherein the first set of windings includes a first phase and a second phase connected at a first neutral point and the second set of windings includes a third phase and a fourth phase connected at a second neutral point;
  a first inverter coupled to the first set of windings, wherein the first inverter includes a first phase leg connected to the first phase, a second phase leg connected to the second phase, and a third phase leg connected to the first neutral point; and
  a second inverter coupled to the second set of windings, wherein the second inverter includes a fourth phase leg connected to the third phase, a fifth phase leg connected to the fourth phase, and a sixth phase leg connected to the second neutral point.

2. The automotive drive system of claim 1, wherein the first set of windings comprises a first two-phase winding structure and the second set of windings comprises a second two-phase winding structure.

3. The automotive drive system of claim 1, further comprising a first energy source coupled to the first inverter, wherein the first energy source is selected from a group consisting of a battery, a fuel cell, and an ultracapacitor.

4. The automotive drive system of claim 3 further comprising a second energy source coupled to the second inverter, wherein the second energy source is selected from a group consisting of a battery, a fuel cell, and an ultracapacitor.

5. The automotive drive system of claim 1, wherein the first phase and the second phase have a first spatial displacement providing an electrical angle of 90° between the first phase and the second phase.

6. The automotive drive system of claim 5, wherein the third phase and the fourth phase have a second spatial displacement providing an electrical angle of 90° between the third phase and the fourth phase.

7. The automotive drive system of claim 6, wherein the first phase and the fourth phase have a third spatial displacement providing an electrical angle of 90° between the first phase and the fourth phase.

8. The automotive drive system of claim 1, wherein:

the first phase leg comprises a first pair of switches, the first phase being connected between switches of the first pair;

the second phase leg comprises a second pair of switches, the second phase being connected between switches of the second pair;

the third phase leg comprises a third pair of switches, the first neutral point being connected between switches of the third pair;

the fourth phase leg comprises a fourth pair of switches, the third phase being connected between switches of the fourth pair;

the fifth phase leg comprises a fifth pair of switches, the fourth phase being connected between switches of the fifth pair; and the sixth phase leg comprises a sixth pair of switches, the second neutral point being connected between switches of the sixth pair.

9. An inverter system for use in a vehicle having a first energy source and a second energy source, the inverter system comprising:

a motor having a first set of windings and a second set of windings, the first set of windings being electrically isolated from the second set of windings, wherein the first set of windings comprises a first two-phase winding structure connected at a first neutral point and the second set of windings comprises a second two-phase winding structure connected at a second neutral point;

a first inverter coupled to the first energy source and adapted to drive the motor, wherein each phase of the first two-phase winding structure and the first neutral point are connected to the first inverter;

a second inverter coupled to the second energy source and adapted to drive the motor, wherein each phase of the second two-phase winding structure and the second neutral point are connected to the second inverter; and a controller coupled to the first inverter and the second inverter, the controller being configured to control the first inverter and the second inverter to achieve desired power flow between the first energy source, the second energy source, and the motor.

10. The inverter system of claim 9, wherein the controller is configured to control power flow from the first energy source to drive the motor.

11. The inverter system of claim 10, wherein the controller is configured to control electromagnetic charging of the second energy source by the motor.

12. The inverter system of claim 9, wherein the controller is configured to produce an effective neutral point of the motor and control power flow from the second energy source to drive the motor.

13. The inverter system of claim 12, wherein the second energy source is a lithium-ion battery.

14. The inverter system of claim 9, wherein:

the first two-phase winding structure includes a first phase and a second phase connected at the first neutral point;

the first inverter includes a first switch pair coupled to the first phase, a second switch pair coupled to the second phase, and a third switch pair coupled to the first neutral point;

the second two-phase winding structure includes a third phase and a fourth phase connected at the second neutral point; and the second inverter includes a fourth switch pair coupled to the third phase, a fifth switch pair coupled to the fourth phase, and a sixth switch pair coupled to the second neutral point.

15. The inverter system of claim 14, wherein:

the first phase is connected between switches of the first switch pair;

the second phase is connected between switches of the second switch pair;

the first neutral point is connected between switches of the third switch pair;

the third phase is connected between switches of the fourth switch pair;

the fourth phase is connected between switches of the fifth switch pair; and the second neutral point is connected between switches of the sixth switch pair.

16. A method for controlling a four-phase motor using a double-ended inverter system coupled to a first energy source and a second energy source, the four-phase motor including a first two-phase winding structure connected at a first neutral point and a second two-phase winding structure connected at a second neutral point, wherein a first inverter of the double-ended inverter system is coupled to the first energy source, each phase of the first two-phase winding structure and the first neutral point being connected to the first inverter, and a second inverter of the double-ended inverter system is coupled to the second energy source, each phase of the second two-phase winding structure and the second neutral point being connected to the second inverter, the method comprising:

determining an operating mode;

modulating the double-ended inverter system to provide power to the four-phase motor using both energy sources in response to a first operating mode;

modulating the double-ended inverter system to provide electromagnetic charging of either energy source in response to a second operating mode; and modulating the double-ended inverter system to produce an effective neutral point of the four-phase motor and provide power to the four-phase motor from the second energy source when the first energy source is unavailable in response to a third operating mode.

17. The method of claim 16, wherein the first operating mode occurs when the four-phase motor requires additional power.

18. The method of claim 16, wherein the second operating mode occurs when the first energy source can provide excess power to the four-phase motor.

* * * * *